United States Patent [19]
Deisenroth

[11] 3,797,817
[45] Mar. 19, 1974

[54] CLOSURE COUNTERBALANCE

[75] Inventor: Robert J. Deisenroth, Elkhart, Ind.

[73] Assignee: Excel Industries, Inc., Elkhart, Ind.

[22] Filed: June 22, 1972

[21] Appl. No.: 265,334

[52] U.S. Cl. .................................. 267/71, 267/168
[51] Int. Cl. ............................................. F16f 3/04
[58] Field of Search .................. 267/70, 71, 69, 168

[56] References Cited
UNITED STATES PATENTS

| | | | |
|---|---|---|---|
| 2,694,318 | 11/1954 | Smith et al. | 267/71 |
| 571,972 | 11/1896 | Janney | 267/168 |
| 3,531,069 | 9/1970 | Dubbenley | 267/168 |
| 537,346 | 4/1895 | Maag | 267/71 |
| 2,420,276 | 5/1947 | Wood | 267/70 |
| 2,856,077 | 10/1958 | Stanton | 267/71 |

FOREIGN PATENTS OR APPLICATIONS

| | | | |
|---|---|---|---|
| 426,810 | 4/1935 | Great Britain | 267/69 |

*Primary Examiner*—James B. Marbert
*Assistant Examiner*—Kenneth Noland
*Attorney, Agent, or Firm*—Whittemore, Hulbert & Belknap

[57] ABSTRACT

The closure counterbalance is for attachment as a strut between a movable closure which is hingedly fastened to a support structure. The counterbalance includes a pair of tubular members telescopingly connected together in sliding relationship. A compression coil spring within the members urges the members apart. A wooden rod is provided within the tubular members. The wooden rod fixed extends into the spring in sliding relationship therewith to support and guide the spring and prevent the spring from buckling against the inner surface of the tubular members.

9 Claims, 6 Drawing Figures

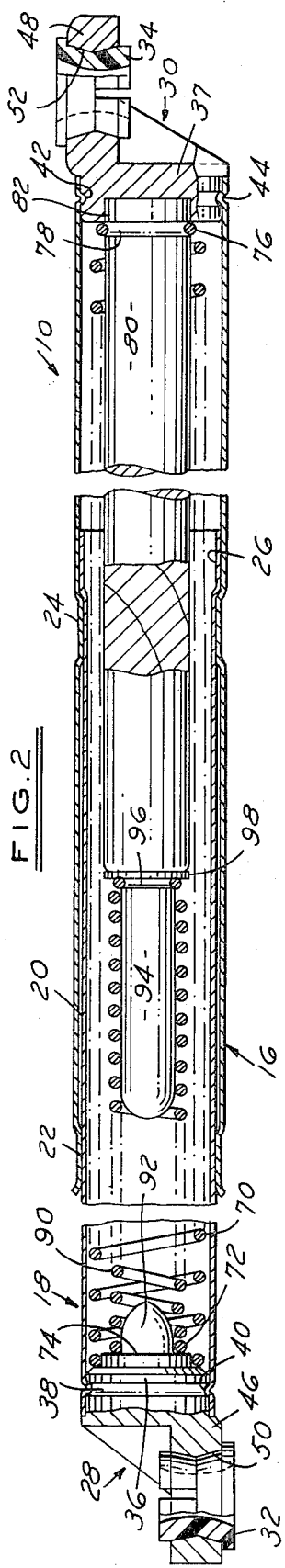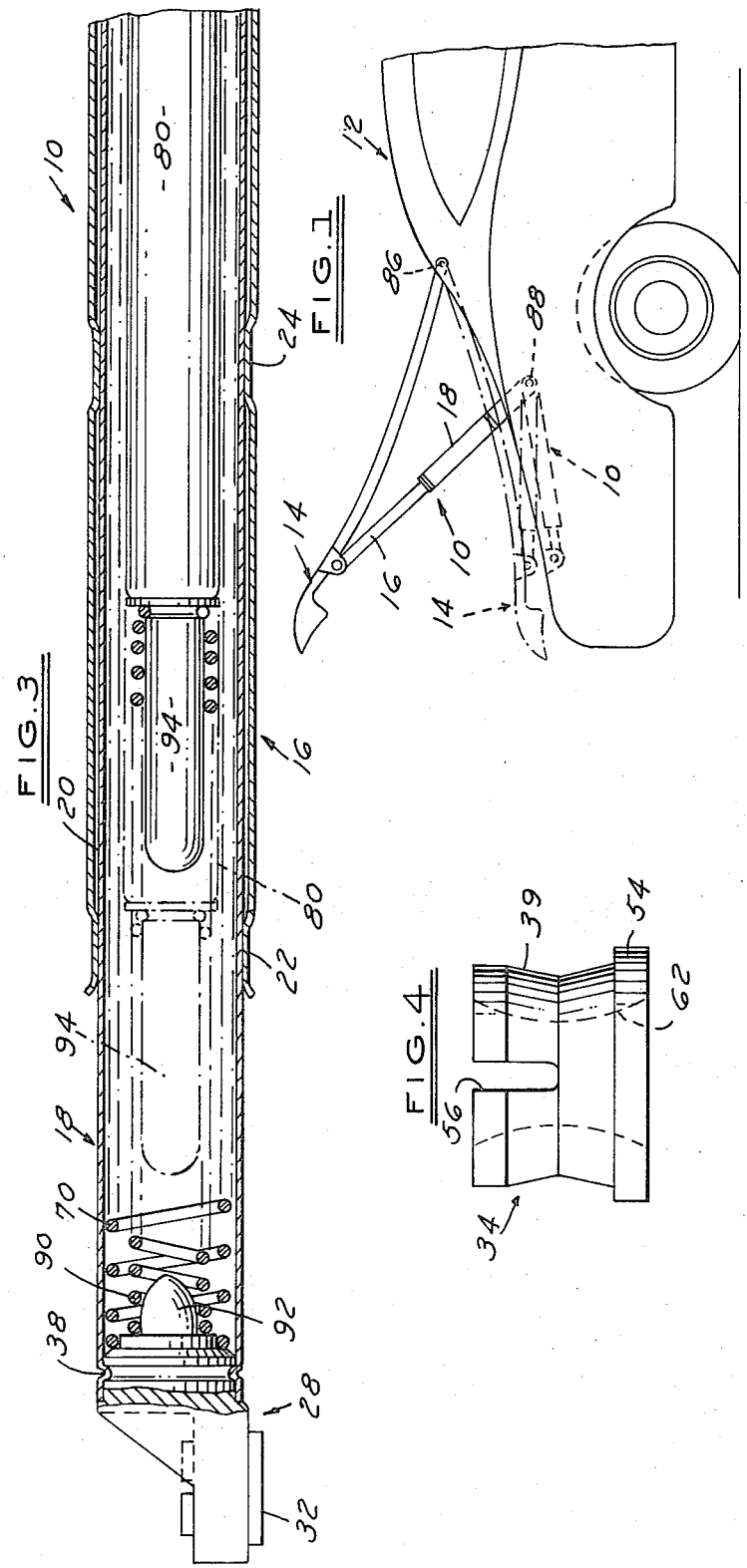

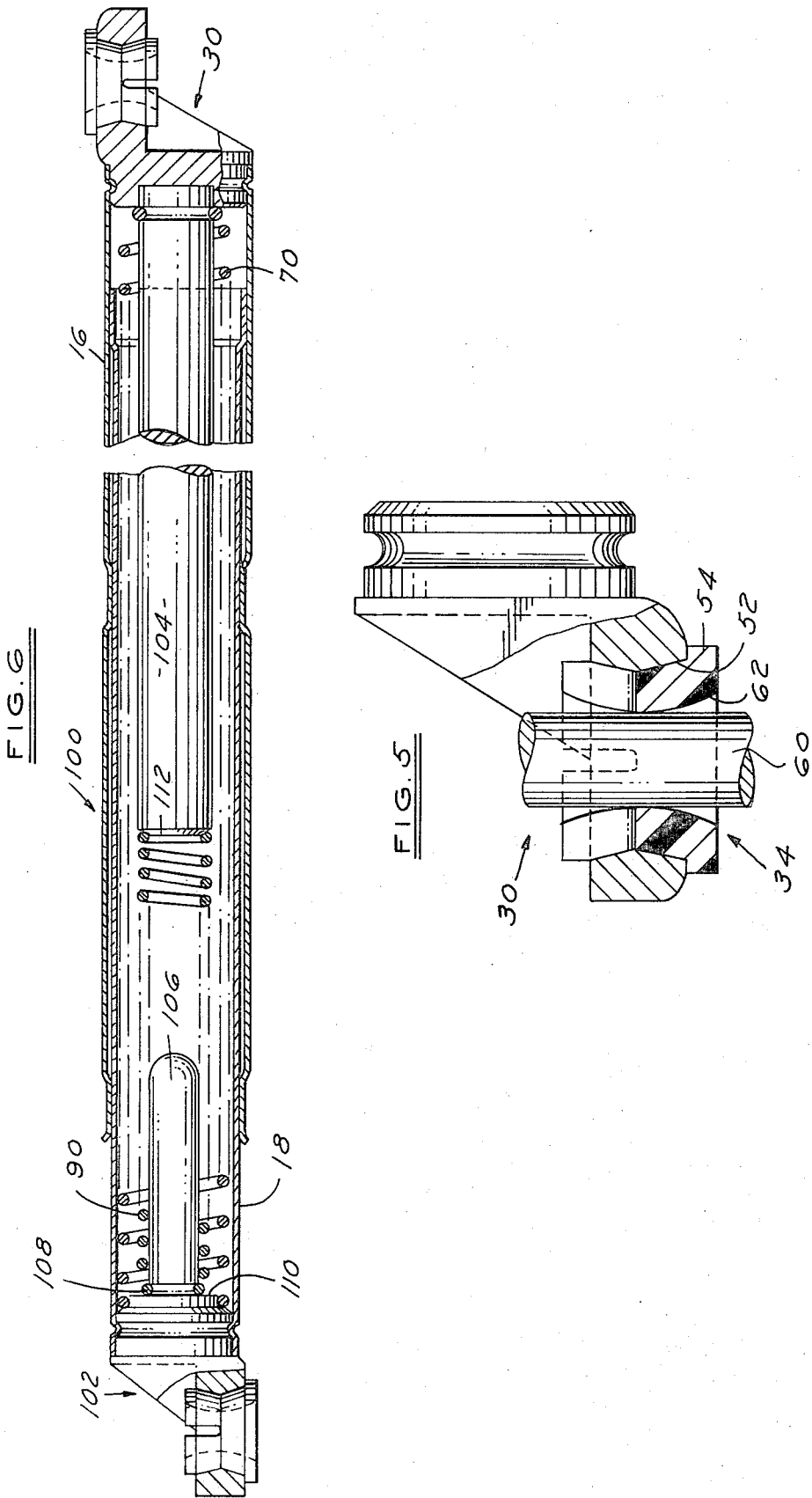

CLOSURE COUNTERBALANCE

BACKGROUND OF THE INVENTION

This invention is in the field of counterbalancing devices. In many instances it is desirable to counterbalance the weight of a movable closure and to hold the closure safely in an open position. Such closures may be, for example, automobile deck lids and hatch covers, hoods, tail gates and rear wall structures. These closures are desirably counterbalanced in an open position. Because of the weight of such closures, it is desired to provide such counterbalancing structures so that the user of the vehicle will not have to lift the entire weight of the closure. The present invention provides a counterbalancing device which is quiet in operation, which includes helper spring means to cause initial operator unassisted opening of the closure, and which includes novel grommet means for attaching the counterbalance between the movable structure and fixed support structure.

SUMMARY OF THE INVENTION

The counterbalance is provided for a movable closure on a structure. It comprises first and second tubular members telescopingly connected together in sliding relationship. Each of the members has abutment structure at the outer end thereof. A compression coil spring is provided within the members. The ends of the spring press against the abutment structure thereby urging the tubular members apart. The outer diameter of the spring is less than the inner diameter of either of the tubular members. An elongated wooden rod is provided within the tubular members with one end socketed in the abutment structure of one of the tubular members and extending into the spring in sliding relationship therewith to support and guide the spring. The wooden rod terminates short of the abutment structure of the other of the tubular members when the tubular members are fully telescoped together. A helper spring may also be provided to cause initial operator unassisted movement of a movable closure to which the counterbalance is connected. Novel grommet structuer may also be provided at the abutment ends of the tubular members for securement thereof between a movable closure and associated fixed structure.

IN THE DRAWINGS

FIG. 1 is a view of the rear portion of an automobile illustrating the closure counterbalance of the present invention installed on the hinged hatch-back panel thereof;

FIG. 2 is a longitudinal sectional view illustrating one embodiment of the closure counterbalance of the present invention in the fully open position;

FIG. 3 is a longitudinal sectional view of the closure counterbalance of FIG. 2 illustrating the closure counterbalance in a partially open position and, in dotted lines, in the fully closed position;

FIG. 4 is a view of a grommet utilized in securing the closure counterbalance to associated structure;

FIG. 5 is a view partially in cross-section illustrating the grommet of FIG. 4 mounted in an integral bracket and closure element which is secured to one end of the closure counterbalance; and FIG. 6 is a longitudinal cross-sectional view of another embodiment of the closure counterbalance of the present invention.

FIG. 1 illustrated the closure counterbalance 10 representatively mounted on an automobile 12 between the hinged hatch-back 14 and fixed support structure within the vehicle trunk space. The term "hatch-back" refers to a rear closure panel for an automobile which covers the trunk space as is commonly done by means of a deck lid and which also includes the vehicle rear window structure. The closure counterbalance 10 is adapted to permit movement of the hatch-back 14 from a fully closed position to a fully open position as illustrated. An intermediate position is also illustrated in dotted lines. The closure counterbalance 10 includes helper spring structure which will initially move the hatch-back 14 to the intermediate position without manual assistance upon opening of the lock which normally secures the hatch-back to the vehicle body. Movement of the hatch-back 14 from the intermediate position to the fully open position initially requires manual assistance at intermediate position, but thereafter the hatch-back will move to the fully open position as a consequence of spring force.

It should be appreciated that while the closure counterbalance 10 is illustratively shown as being used in connection with a hatch-back 14 of an automobile, the closure counterbalance may be utilized in any situation where it is desired to provide such a counterbalance device for opening and closing of a panel structure.

As shown in FIGS. 2 and 3, the closure counterbalance 10 comprises a pair of telescopic tubular members 16, 18. The tubular member 16 is of larger diameter than the member 18 so that these members may be telescoped together. The diameter of member 16 is sufficiently greater than the diameter of member 18 to provide for a space 20 therebetween. The provision of such a space reduces the frictional contact between the tubular members thus making the members easier to telescope into and out of each other.

The inner end 22 of the tubular member 16 is rolled radially inwardly to define a bearing area for sliding contact with the tubular member 18. A similar inwardly rolled portion 24 is provided spaced from the end portion 22. The rolled portions provide means for guiding the tubular member 16 over the tubular member 18 during telescoping of these members.

The roller portion 24 also serves as stop means to limit the extent of separation of the tubular members. As will be noted in FIG. 2, the inner end portion 26 of tubular member 18 is expanded radially outwardly to form an end portion of larger diameter which contacts portion 24 when the counterbalance is fully extended to prevent separation of the members. As will be noted, the portions 24, 26 are relatively long. This length is energy absorbing and, when overpull is applied, results in high resistance to deformation thus resisting separation of the tubular members.

Integral bracket and closure elements 28, 30 are provided in the outer ends of the tubular members 16, 18. The elements 28, 30 may be fabricated of, for example, metal or a reinforced plastic such as glass filled nylon. The elements 28, 30 are adapted to receive grommets 32, 34. In the event that the elements 28, 30 are fabricated of a plastic, the grommets 32, 34 may be made integral therewith.

The element 28 has a plug or closure portion 36 which is received within the outer end of the tubular member 18. An annular groove 38 is provided in portion 36. An annular portion 40 of the member 18 is crimped into the groove 38 to secure the parts together. The element 30 also has a groove 42 which receives crimped portion 44 of tubular member 16 to secure these parts together.

Each of the elements 28, 30 has a bracket portion 46, 48 extending at substantially right angles to the closure portions 36, 37. The grommets 32, 34 are received within openings 50, 52 provided in portions 46, 48. The grommet 34 is illustrated in FIG. 4 by itself and in cross-section in FIG. 5 installed in the element 30. As will be noted, the opening 52 is of larger diameter at its outer ends than at the center, the diameter being reduced from each end toward the center to form a V-shaped configuration in cross-section. The middle portion of the opening is of the smallest diameter being the apex of the V. The outer surface portion 39 of the grommet 34 has a configuration matching the interior of the opening. The grommet has a peripheral flange 54 at one end thereof which acts as a stop member when the grommet is inserted into the opening. Four spaced apart slots 56 are provided in the opposite end of the grommet. The slots 56 permit deformation of the end of the grommet for insertion into the opening. Once inserted, the end again expands thus locking the grommet in place. The grommet is preferably fabricated of elastomeric material such as a thermoplastic polyester, for example, polyterephthalate.

The shank 60 of a bolt is received through the central opening of the grommet. The bolt secures the closure counterbalance to associated structure of the vehicle, one end of the closure counterbalance being secured to the vehicle body while the other end is secured to the hatch-back 14. The interior surface 62 of the opening through the grommet is curved from end-to-end of the grommet with the outer ends of the opening being enlarged while the center portion is of reduced diameter. This permits the shank 60 to pivot a slight degree in the opening to accommodate the movement of the closure counterbalance as the hatch-back 14 is opened and closed. Additionally, this arrangements permits installation of the closure counterbalance even where there is a slight misalignment to thus permit relative freedom of manufacturing tolerances. Illustratively, the nature of the opening through the grommet 34 permits 3 and ½° tilting in each direction. Such tilting by means of opening 62 is preferred as opposed to tilting action resulting from the use of a rubber-like material in fabrication of the grommet. Rubber will, of course, compress permitting a certain amount of tilting of the bolt shank. However, rubber is undesirable because of its relatively low wear characteristics and poor strength chracteristics. Additionally, rubber has a relatively high coefficient of friction which inhibits free movement of the closure counterbalance at its connecting points.

An elongated compression coil spring 70 is provided within the tubular members 16, 18. One end 72 of the spring 70 is received on a boss 74 provided on element 28. The other end 76 is squared and cammed-in and abuts the element 30. The end 76 is cammed-in to engage a groove 78 provided at one end of a wooden rod 80. The end 82 of rod 80 is received in a socket provided in element 30.

The diameter of the spring 70 is less than the diameter of the tubular members 16, 18 so that the spring will not scrape against the surfaces of the tubular members thus causing noise and interfering with opening and closing of the closure counterbalance. The force of the spring 70 is sufficient to counterbalance the weight of the hatch-back 14. The spring 70 is selected with the load which it is to bear being of a known capacity. The counterbalancing effect is also, of course, affected by the angle which the closure counterbalance 10 makes with the hatch-back 14 considering the pivot points 86, 88 (FIG. 1) as moments about which the forces, namely, the hatch-back weight and the spring force, are exerted. The actual spring used thus must be determined within the environment of the particular structure in which the closure counterbalance 10 is to be used.

The wooden rod 80 functions as guide structure for the spring 70. The use of wood is advantageous as opposed to, for example, plastic or metal, in the reduction of noise. Other materials result in offensive squeaking, scraping and rubbing noises which are not satisfactory in automotive construction. Additionally, plastics and metals may result in hard closing action.

It is preferable to use wood in fabricating the rod 80 with the grain of the wood oriented longitudinally. This results in high compressive strength. Additionally, the wood should have a water content as, for example, in the range of 8 to 10 percent. This prevents warping. The rod 80 should be coated with a grease to act as a seal to prevent warping. The use of wood also tends to result in dimensional stability, wood being relatively immune to distortion caused by termperature changes.

A second shorter coil compression spring 90 is provided to aid in the initial opening of the hatch-back 14. The function of the spring 90 is to cause unassisted opening movement of the hatch-back 14 when the lock securing the hatch-back to the vehicle body is unlatched. The hatch-back will pop open a short distance as a consequence of the action of the spring 90 thus leaving a space between the lower edge of the hatch-back and the vehicle body as shown in dotted lines in FIG. 1 permitting grasping of the hatch-back for complete manual opening of the hatch-back. It is undesirable, of course, to have the hatch-back spring all of the way open without manual assistance because such opening could cause personal injury.

As will be noted in FIG. 2, a bullet-shaped projection 92 extends axially inwardly centrally from the inner face of the boss 74. One end of the spring 90 is received on the projection 92 to thus position the spring 90 concentrically with respect to the spring 70. The spring 90 is of smaller diameter than the spring 70 to thus be spaced therefrom. The other end of the spring 90 is received over a projection 94 extending centrally from the end of the rod 80. The projection 94 is of smaller diameter than the rod 80 to fit snugly within the spring 90. A groove 96 is provided adjacent the juncture of projection 94 and the end of the rod 80 to engage the end of the spring 90. A metal washer 98 is provided between the end of the spring 90 and the end of the rod 80 to minimize wear on the rod end.

The operating characteristics of the closure counterbalance 10 may be understood by reference to FIGS. 1–3. As will be noted, when the hatch-back 14 is closed and latched to the vehicle body, the tubular members 16, 18 are telescoped together thus resulting in compression of the spring 70, 90 with positionment of the rod 80 as shown in dotted lines in FIG. 3. Upon unlatching of the lock which secures the hatchback to the vehicle body, the counterbalance will be extended and the hatch-back 14 will spring up a short distance, about 10 degrees, to a counterbalanced position as shown in dotted lines in FIG. 1 and in solid lines in FIG. 3. The initial movement of the hatch-back is manually unassisted, being caused by the conjoint action of spring 70, 90. As will bt noted in dotted lines in FIG. 1, the space that exists between the end of the hatch-back and the vehicle body permits the insertion of a hand to assist initial movement of the hatch-back 14 beyond the counterbalance point to swing to its fully open position as illustrated in solid lines in FIG. 1. Movement of the hatch-back 14 is limited by contact of the portions 24, 26 of the tubular members 16, 18.

A modified closure counterbalance 100 is illustrated in FIG. 6. The construction of the tubular members 16, 18, bracket and closure element 30, spring 70 and spring 90 are the same as in the FIG. 2 embodiment and consequently these elements have been assigned the same numerals. The bracket and closure element 102 and wooden rod 104 have been modified, essentially by reversing the mounting and guide structure for the spring 90.

As will be noted, an elongated projection 106 extends inwardly from the center face of the element 102. This is similar to the elongated projection 94 provided on the rod 80 in the FIG. 2 embodiment. One end of the spring 90 engages an annular groove 108 provided at the juncture of the projection 106 with the inner face 110 of the element 102. The other end of the spring 90 is received on a small projection 112 provided on the end of the rod 104. As will be appreciated, this is a reversal of the corresponding structure illustrated in FIG. 2. Functionally, there is very little difference between the two structures although the FIG. 2 structure is preferred because the moving end of the spring 90 is more firmly supported than is the moving end of the spring in the FIG. 6 embodiment.

What I claim as my invention is:

1. A counterbalance for a movable closure on a structure, comprising first and second tubular members telescopingly connected together in sliding relationship, each of said members having abutment structure at the outer end thereof, a compression coil spring within said members, the end of said spring pressing against said abutment structures thereby urging said tubular members apart, the outer diameter of said spring being less than the inner diameter of either of the tubular members, an elongated wooden rod within said tubular members in engagement at one end with the abutment structure of one of said members and extending into said spring in sliding contact therewith to guide same, said wooden rod terminating short of the abutment structure of the other of said tubular members when said tubular members are telescoped together.

2. A counterbalance as defined in claim 1, further characterized in the provision of a second compression coil spring of smaller diameter and shorter than said aforementioned coil spring positioned within said aforementioned coil spring (the) one end(s) of said spring pressing against one of the inner (end) ends of said wooden rod and the abutment structure of the other of said tubular members and fixedly attached to the other said rod and abutment structure when the tubular members are telescoped together to aid the aforementioned spring in urging said tubular members apart upon initial expansion of the counterbalance to cause unassisted initial movement of the movable closure prior to counterbalancing thereof by the counterbalance.

3. A counterbalance as defined in claim 2, further characterized in the provision of a cylindrical projection extending from the inner end of said wooden rod and of smaller diameter than said rod, said projection extending into the second spring in sliding relationship therewith to support and guide said second spring, and a boss on the abutment structure against which said second spring presses, said boss extending into said second spring to support said second spring.

4. A counterbalance as defined in claim 2, further characterized in the provision of a cylindrical projection on the abutment structure against which said second spring presses, said projection extending into the second spring in sliding relationship therewith to support and guide said second spring, and a boss on the inner end of said wooden rod against which said second spring presses, said boss extending into said second spring to support said second spring.

5. A counterbalance as defined in claim 3, further characterized in that said second spring is fixedly attached to said projection and is freely received on said boss.

6. A counterbalance as defined in claim 4, further characterized in that said second spring is fixedly attached to said projection and is freely received on said boss.

7. A counterbalance as defined in claim 1, further characterized in that the relative diameters of said tubular members are such as to provide an annular space therebetween, stop means on said tubular members for limiting relative outward movement thereof, said stop means comprising an inwardly extending projection on the outer of said members spaced from the inner end thereof, and an outwardly flared inner end on the inner tubular member engageable with said inwardly extending projection, said inwardly extending projection and said outwardly flared inner end being relatively long to provide energy absorbing means to compensate for overpull applied to the counterbalance.

8. A counterbalance as defined in claim 1, further characterized in the provision of bracket means extending from each of said abutment structures, said bracket means including a plastic grommet having a central opening for the reception of cylindrical fastening means for securement of the counterbalance to support structure, said central opening being enlarged at opposite ends of the grommet and having a gradually reduced diameter extending towards the center of the grommet to define an inner surface permitting limited pivoting of said fastening means.

9. A counterbalance as defined in claim 8, further characterized in that said grommet is detachably fastened to said bracket, said bracket having an opening therethrough, said bracket opening having an enlarged diameter at the ends thereof gradually decreasing towards the center thereof, said grommet having a matching external surface, said grommet having slot means at one end thereof permitting compression of said end for insertion into the opening of said bracket.

* * * * *